US012312134B1

(12) United States Patent
Rhodes et al.

(10) Patent No.: US 12,312,134 B1
(45) Date of Patent: May 27, 2025

(54) DISPLAY READY CORRUGATED PACKAGING WITH DOUBLE CORNER CONSTRUCTION

(71) Applicant: Packaging Corporation of America, Lake Forest, IL (US)

(72) Inventors: Jonathan H. Rhodes, Montville, NJ (US); Joe Schomisch, Burlington, WI (US); Scott Miller, Trenton, OH (US)

( * ) Notice: Subject to any disclaimer, the term of this patent is extended or adjusted under 35 U.S.C. 154(b) by 150 days.

(21) Appl. No.: 18/078,865

(22) Filed: Dec. 9, 2022

Related U.S. Application Data

(60) Provisional application No. 63/265,233, filed on Dec. 10, 2021.

(51) Int. Cl.

| | |
|---|---|
| ***B65D 5/02*** | (2006.01) |
| ***B31B 50/26*** | (2017.01) |
| ***B65D 5/00*** | (2006.01) |
| ***B65D 5/42*** | (2006.01) |
| ***B65D 5/44*** | (2006.01) |
| ***B65D 5/54*** | (2006.01) |
| *B31B 100/00* | (2017.01) |
| *B31B 120/30* | (2017.01) |
| *B31B 120/40* | (2017.01) |
| *B31B 120/70* | (2017.01) |

(52) U.S. Cl.

CPC .............. *B65D 5/542* (2013.01); *B31B 50/26* (2017.08); *B65D 5/0227* (2013.01); *B65D 5/443* (2013.01); *B31B 2100/00* (2017.08); *B31B 2120/302* (2017.08); *B31B 2120/40* (2017.08); *B31B 2120/70* (2017.08)

(58) Field of Classification Search

CPC ................ B31B 50/26; B31B 2100/00; B31B 2120/302; B31B 2120/40; B31B 2120/70; B65D 5/02; B65D 5/0227; B65D 5/0281; B65D 5/441; B65D 5/443; B65D 5/542; A47B 47/06; A47F 3/14

USPC ........ 206/774, 736; 229/242, 240, 238, 117, 229/113, 919

See application file for complete search history.

(56) References Cited

U.S. PATENT DOCUMENTS

| | | | | |
|---|---|---|---|---|
| 3,168,974 A * | 2/1965 | Buttery | B65D 5/5415 | 229/145 |
| 3,310,221 A * | 3/1967 | Duncan | B65D 5/0281 | 229/117.17 |
| 3,727,824 A | 4/1973 | Giebel et al. | | |
| 3,833,165 A * | 9/1974 | Hoiles | B65D 5/5415 | 229/198.2 |
| 3,844,473 A * | 10/1974 | Whelan | B65D 5/0281 | 229/117.17 |
| 4,372,477 A | 2/1983 | Wytko | | |

(Continued)

FOREIGN PATENT DOCUMENTS

WO WO 2021/011261 A1 6/2021

*Primary Examiner* — Gideon R Weinerth

(74) *Attorney, Agent, or Firm* — Klarquist Sparkman, LLP

(57) ABSTRACT

A blank for use in forming a container, such as a corrugated fiberboard container, can include a reinforcement portion that provide improved structural integrity for a display ready container. The reinforcing portion can include at least a first front wall reinforcement portion and a second front wall reinforcement portion, with the first and second front wall reinforcement portions being spaced apart from one another. The front wall and a front top section can have removable panels when used as a display container.

20 Claims, 21 Drawing Sheets

(56) References Cited

U.S. PATENT DOCUMENTS

| | | | | | |
|---|---|---|---|---|---|
| 4,406,380 | A * | 9/1983 | Paige | B65D 5/0281 | 229/117 |
| 5,011,071 | A * | 4/1991 | Lopez | B65D 5/0281 | 229/117 |
| 6,712,214 | B1 * | 3/2004 | Wintermute | B65D 5/006 | 206/745 |
| 8,763,888 | B2 * | 7/2014 | Willman | B65D 5/542 | 229/117 |
| 8,955,677 | B2 * | 2/2015 | Ladler-Dennis | B65D 5/5004 | 229/116.1 |
| 8,998,074 | B2 * | 4/2015 | Schomisch | B65D 5/326 | 229/242 |
| 10,472,122 | B2 | 11/2019 | Aguirre | | |
| 11,072,457 | B2 * | 7/2021 | Gressel | B65D 5/001 | |
| 11,186,404 | B2 * | 11/2021 | McLeod | B65D 5/22 | |
| 11,472,595 | B1 * | 10/2022 | Rhodes | A47B 47/06 | |
| 12,049,346 | B1 * | 7/2024 | Bley | B65D 5/0227 | |
| 2003/0226783 | A1 * | 12/2003 | Jackson | B65D 5/542 | 206/769 |
| 2005/0263434 | A1 * | 12/2005 | Tibbels | B65D 5/52 | 206/774 |
| 2013/0206828 | A1 * | 8/2013 | Schomisch | B65D 5/541 | 229/242 |
| 2013/0221079 | A1 * | 8/2013 | Dowd | B65D 5/443 | 229/117 |
| 2015/0060538 | A1 * | 3/2015 | Laughman | B65D 5/48014 | 229/242 |
| 2017/0275047 | A1 | 9/2017 | Couture | | |
| 2018/0273238 | A1 | 9/2018 | Wagner et al. | | |
| 2020/0331653 | A1 | 10/2020 | DeJesus | | |

* cited by examiner

DISPLAY READY CORRUGATED PACKAGING WITH DOUBLE CORNER CONSTRUCTION

CROSS REFERENCE TO RELATED APPLICATION

This application claims the benefit of U.S. Provisional Application No. 63/265,233, filed Dec. 10, 2021, which is incorporated herein by reference in its entirety.

FIELD

This disclosure relates generally to containers, including containers for use as delivery and display packages, and methods of manufacturing such containers.

SUMMARY

Disclosed herein are corrugated fiberboard containers comprising an exterior portion and a reinforcing portion. The exterior portion comprises a front wall, a rear wall, a left side wall, a right side wall, a bottom section, and a top section. The reinforcing portion comprises at least a first front wall reinforcement portion and a second front wall reinforcement portion, the first and second front wall reinforcement portions being spaced apart from one another and secured to the front wall. The front wall comprises a first removable panel, the first wall reinforcement portion comprises a second removable panel, and the second wall reinforcement portion comprises a third removable panel. The second and third removeable panels overlap with the first removable panel, such that the removal of the first removable panel also removes the second and third removable panels.

In some embodiments, the reinforcing portion comprises a right reinforcing panel and a left reinforcing panel, the right reinforcing panel including the first front wall reinforcement portion and the left reinforcing panel including the second front wall reinforcement portion. The right reinforcing panel can comprise a right side wall reinforcement portion and the left reinforcing panel can comprise a left side wall reinforcement portion, with the right side wall reinforcement portion being positioned adjacent the right side wall and the left side wall reinforcement portion being positioned adjacent the left side wall.

In some embodiments, the right reinforcing panel extends from the bottom right wall and the left reinforcing panel extends from the bottom left wall. The top front wall can comprise a fourth removable panel that extends from and is continuous with the first removable panel. The top front wall can comprise a tear strip that extends across a width of the top front wall to separate the fourth removable panel from the top front wall. The top right wall and top left wall can be shaped to collectively define an opening into the container through the top section when the fourth removable panel is removed. Removing the first, second, third, and fourth removable panels can define an opening that extends from the front wall to the top section.

In some embodiments a method of forming a corrugated fiberboard container is provided. The method includes providing a blank comprising an exterior portion comprising a front wall, a rear wall, a left side wall, a right side wall, a bottom section, and a top section, and folding the blank about a first fold line to position a reinforcing portion of the blank adjacent inner surfaces of the exterior portion. The reinforcing portion can comprise at least a first front wall reinforcement portion and a second front wall reinforcement portion, the first and second front wall reinforcement portions being spaced apart from one another. The method can also include securing at least some portions of the reinforcing portion to inner surfaces of the exterior portion, and folding the blank about a second fold line and about a third fold line and securing adjacent portions to form an open ended box. The blank can be positioned to form a container with the front side wall, right side wall, and left side wall being adjacent respective areas of the reinforcing portion. The front wall can include a first removable panel, the first wall reinforcement portion comprises a second removable panel, and the second wall reinforcement portion comprises a third removable panel, and the second and third removeable panels overlap with the first removable panel, such that the removal of the first removable panel also removes the second and third removable panels. The top front wall can include a fourth removable panel that extends from and is continuous with the first removable panel.

The foregoing and other objects, features, and advantages of the invention will become more apparent from the following detailed description, which proceeds with reference to the accompanying figures.

DETAILED DESCRIPTION

General Considerations

Figure 1:
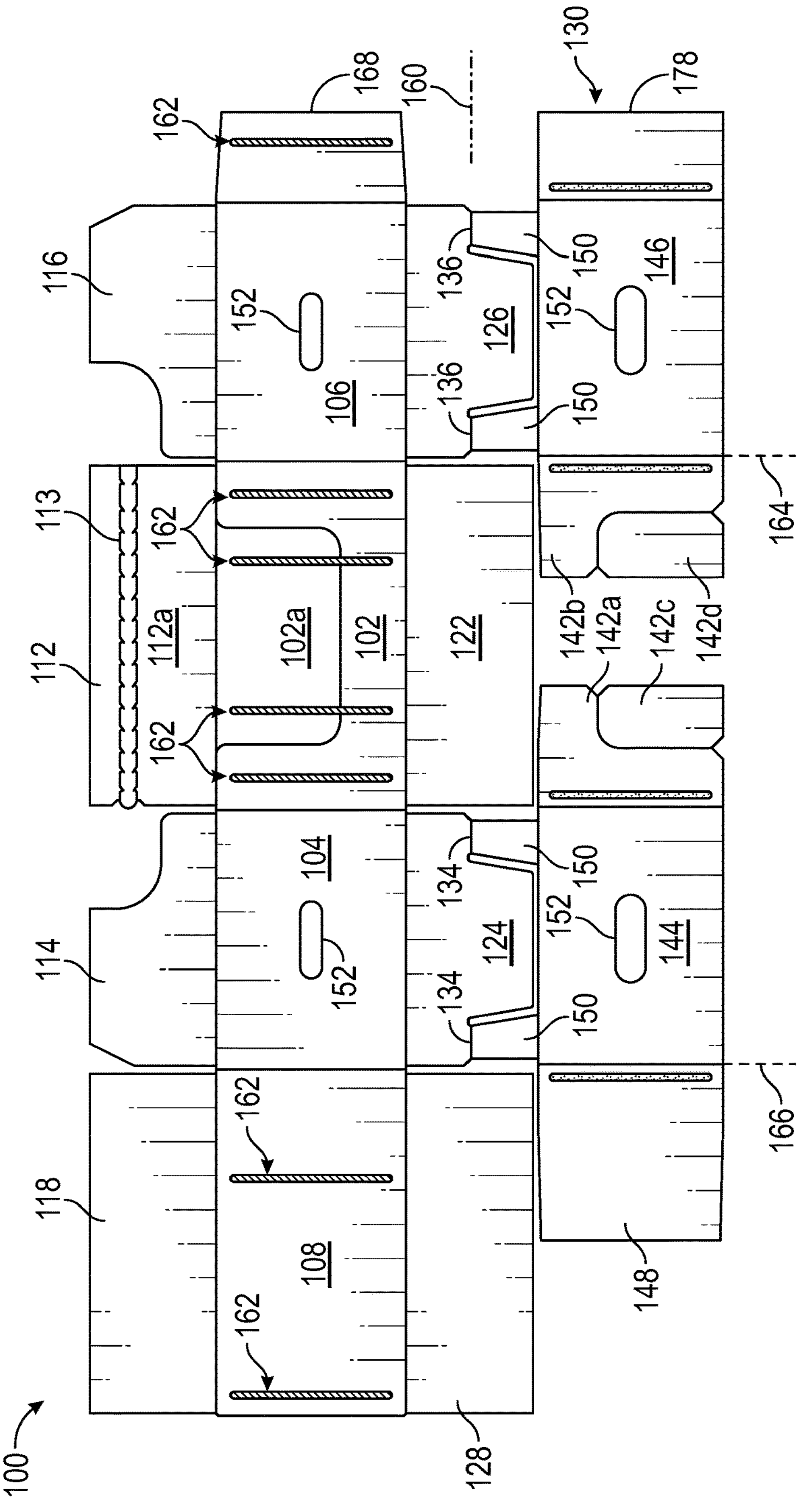
FIG. 1 illustrates a first side of an exemplary blank for constructing a container.
Figure 2:
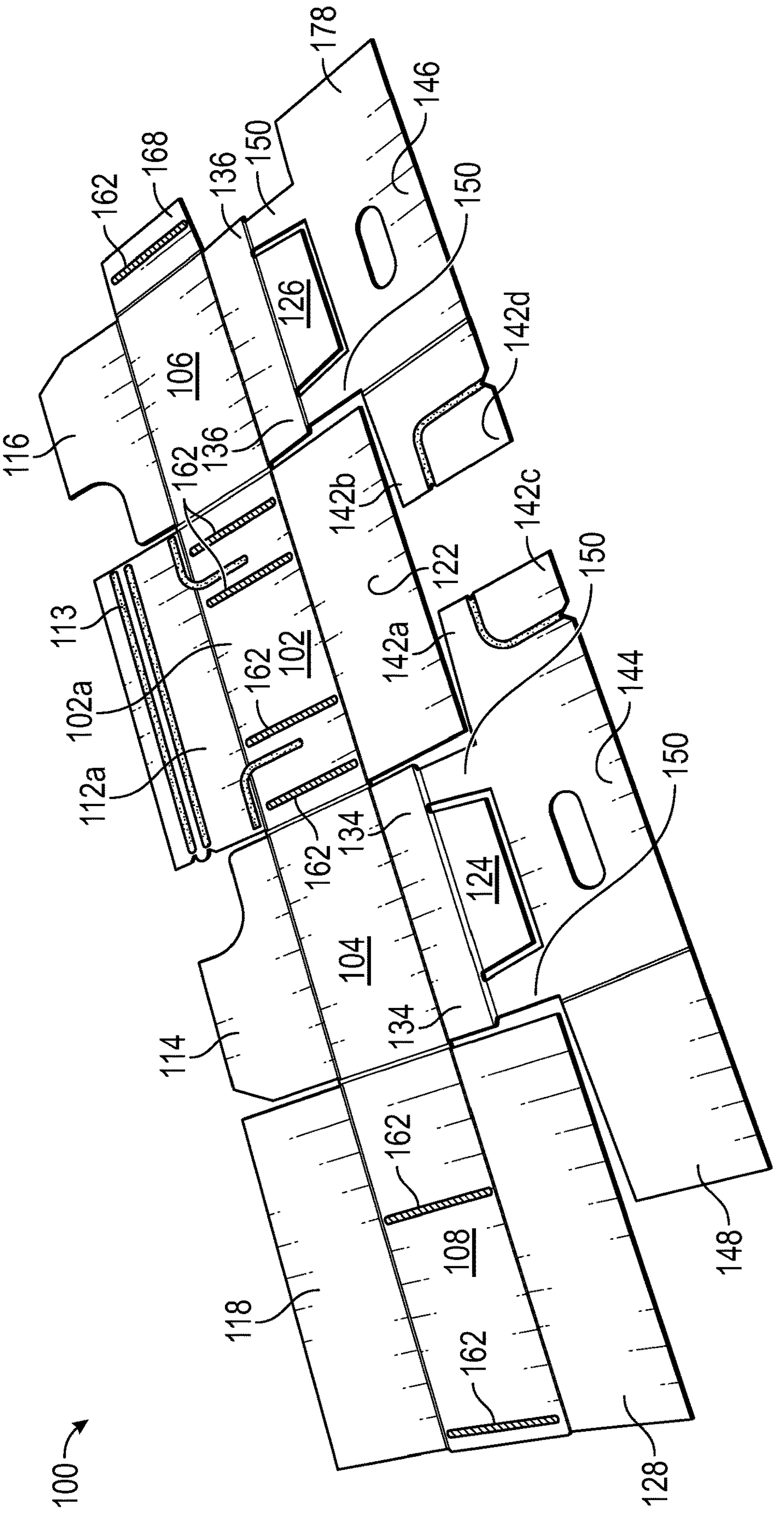
FIG. 2 illustrates a first side of an exemplary blank for constructing a container.

As used in this application the singular forms "a," "an," and "the" include the plural forms unless the context clearly dictates otherwise. Additionally, the term "includes" means "comprises." Furthermore, as used herein, the term "and/or" means any one item or combination of items in the phrase. In addition, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the term "container" refers to an article that is capable of holding one or more products or other physical articles. As used herein, the term "corrugated paperboard box" refers to a box formed from any of a variety of heavy paper-like materials, including, for example, cardstock, corrugated fiberboard, and/or paperboard.

As used herein, the term "blank" refers to a flat sheet of material that is formed into a container, such as a flat sheet of corrugated paperboard. As used herein, "corrugated fiberboard" refers to a material having a fluted corrugated sheet and one or two flat linerboards. The linerboards described herein can be made of a variety of materials and can have any desirable color or construction. For example, linerboards can have, without limitation and in whole or in part, a construction that includes an inside and/or outside face that is white, kraft, mottled, colored, and/or preprinted with a graphic or other desired surface ornamentation.

As used herein, the term "flat-formed" refers to an article that is manufactured from one or more flat pieces, such as a blank, that are manipulated into a different shape, such as by folding. As used herein, the term "hingedly coupled" refers to any manner of engagement between a first part of a blank relative to a second part of the blank which allows the first part to travel relative to the second part, such as by one or more fold lines, one or more cut lines, and/or some combination thereof. In some embodiments, the first part does not fully disengage from the second part during construction of the container. In other embodiments, the first part can be fully disengaged (i.e., separated) from the second part during construction of the container.

As used herein, the term "fold lines" refers to any creasing, perforations, or the like that facilitates folding of a wall or other portion of a blank, including, for example, one or more perforations, slit-scores, slit/crease combinations, curved scores, wide-crush zones, embossing, and/or any combination of the same.

As used herein, the term "cut line" refers to type of fold line in which an area that includes a cut that extends at least partially through the blank to facilitate folding, tearing, and/or some other structural advantage. Cut lines can be straight, curved, or some other shape, and can include perforation lines in which the cut is not continuous along the length of the cut line (i.e., a perforated line is a cut line that is discontinuous).

For the purposes of this disclosure, relative terms such as "vertical", "horizontal", "top". "bottom", "front", "back", "end" and "sides" may be used. It should be understood, however, that the terms are used only for purposes of description, and are not intended to be used as limitations. Accordingly, the orientation of an object or a combination of objects may change without altering the scope of the invention.

As used herein the term "KDF" or "KDF blank" refers to a knocked-down flat blank, which is a flat condition in which the box is generally shipped for use, prior to forming a box from the blank.

Exemplary Containers and Methods of Constructing the Same

FIG. 1 illustrates an exemplary embodiment of a blank 100 that can be formed into a container, such as a corrugated paperboard box. A first side of the blank (i.e., a top side) faces up and a second side (i.e., a bottom side) faces down.

As discussed below in more detail, blank 100 can be constructed into a container that comprises a plurality of side walls that provide improved structural integrity, including improved stacking strength. Blank 100 has an outer front wall 102, and outer right side wall 104, an outer left side wall 106, and an outer rear wall 108. Blank 100 also has a top front wall 112, a top right wall 114, a top left wall 116, and a top rear wall 118. In addition, blank 100 has a bottom front wall 122, a bottom right wall 124, a bottom left wall 126, and a bottom rear wall 128.

A reinforcing portion 130 extends from one or more portions of the bottom front wall 122, the bottom right wall 124, the bottom left wall 126, and/or the bottom rear wall 128. For example, as shown in FIG. 1, reinforcing portion 130 extends from the bottom right wall 124 and the bottom left wall 126. Reinforcing portion 130 is connected at two regions on each, for example at connections 134 on the bottom right wall 124 and connections 136 on the bottom left wall 126. Fold line 160 can extend across connections 134, 136 to facilitate folding the reinforcing portion 130 so that it at least partially overlap with portions of one or more of the outer front wall 102, and outer right side wall 104, an outer left side wall 106, and an outer rear wall 108.

Reinforcing portion 130 can comprise an inner front wall portions 142*a*, 142*b*, an inner right side wall portion 144, an inner left side portion 146, and an inner rear wall portion 148. One or more extending members 150 can extend between connections 134, 136 and respective portions of one or more of the inner front wall portions 142*a*, 142*b*, an inner right side wall portion 144, an inner left side portion 146, and an inner rear wall portion 148. Referring to FIG. 1, the extending members 150 extend between connections 134, 136 and respective portions of the bottom right wall 124 and bottom left wall 126.

As shown in FIG. 1, inner front wall portions 142*a*, 142*b* are spaced apart from one another. As used herein, "spaced apart" means that there is a gap between adjacent edges or sides of the two elements (e.g., inner front wall portions 142*a*, 142*b*). In the case of inner front wall portions 142*a*, 142*b*, there is a gap, or space, between the edges of inner front wall portion 142*a* and inner front wall portion 142*b* because each portion extends from a respective inner portion (e.g., inner right side portion 144 for inner front wall portion 142*a* and inner left side portion 146 for inner front wall portion 142*b*) and the two portions have a width that is less than half the width of outer front wall 102, thereby providing a central gap (widthwise) between the two inner front wall portions 142*a*, 142*b*. In some embodiments, a width of the gap that is formed between the two inner front wall portions 142*a*, 142*b* is at least 20% of the width of the outer front wall 102, or at least 30% of the width of the outer front wall 102 in other embodiments.

The overlapping portions of the reinforcing portion 130 (e.g., inner front wall portions 142*a*, 142*b*, an inner right side wall portion 144, an inner left side portion 146, and an inner rear wall portion 148) have a width and a height. The height can be the same or different from the adjacent wall that each overlaps. In addition, different overlapping portions can have different heights. Preferably, however, at least some of the heights are substantially the same as the overlapped wall (e.g., an outer front wall 102, and outer right side wall 104, an outer left side wall 106, and an outer rear wall 108) so that the overlapping portions of the reinforcing portions 130 can provide vertical structural support. A height is substantially the same if it can support a load placed on top of the container, either by having generally the same height as the side wall or by having underlying structures that effectively increase the height of the overlapping portions (at least at some areas) to substantially the same as the side wall.

As shown in FIG. 1, the two inner front wall portions 142*a*, 142*b* can have an L-shape in which the height of an area of the two inner front wall portions 142*a*, 142*b* that is closer to the side portions (i.e., inner right side portion 144 or inner left side portion 146) is greater than a height that is closer to the central gap area. In other words, each of the two inner front wall portions 142*a*, 142*b* has an outer section that has a first height and an inner section that has a second height, with the first height being greater than the second height. In some embodiments, the first height corresponds to a height of the outer front wall 302.

One or more cut lines can be provided to facilitate the removal of portions of the blank, either during or after construction. For example, as shown in FIG. 1, a plurality of handle portions 152 can be formed from cut lines and the handle portions 152 can be removed to define an opening into the container for handling the container. Handle portions 152 can be placed so that after folding, the two or more handle portions 152 overlap with one another as shown in FIG. 1.

In addition, cut lines can be provided elsewhere along the blank to facilitate removal of other portions of the blank, such as one or more removable panels 142*c* and 142*d* of inner front wall portions 142*a*, 142*b* and removable panel 102*a* of the outer front wall 102. As described herein, these portions overlap and can be removed together. In addition, top front wall 112 can have a removable panel 112*a* that is hingedly coupled to portions of the outer front wall (e.g., the removeable panel 102*a*) so that removeable of both collectively provides a display opening that extends from the front wall to the top wall. Removable panel 112*a* can be removed by any provided means, such as by pulling a tearstrip 113.

Although shown on a "front" wall, it should be understood that the removable portion can be located on any other wall. In addition, as discussed above, the directional terms (e.g., front) used herein are for purposes of description only, and are not intended to be used as limitations since the orientation of the object can vary.

In constructing the container, blank 100 can be folded about first fold line 160. One or more adhesives can be applied to the blank to secure facing surfaces together. For example, glue strips 162 can be applied to the blank 100 to secure facing surfaces together in the vicinity of a respective glue strip after the blank 100 is folded about the first fold line 160 into a first folded configuration (e.g., FIGS. 3 and 4).

Figure 3:
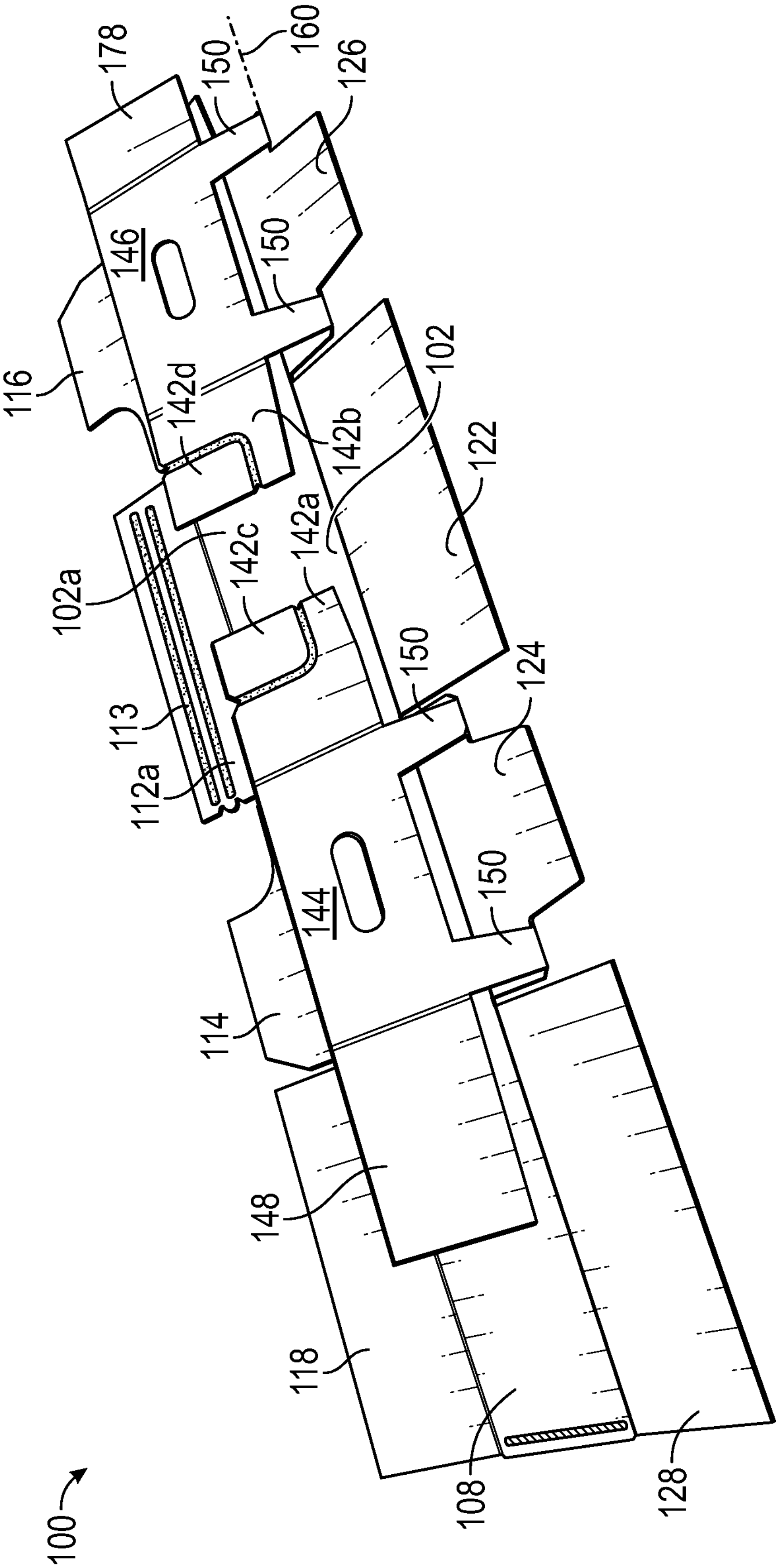
FIG. 3 illustrates an exemplary blank being folded into a first intermediate stage of constructing a KDF blank.
Figure 4:
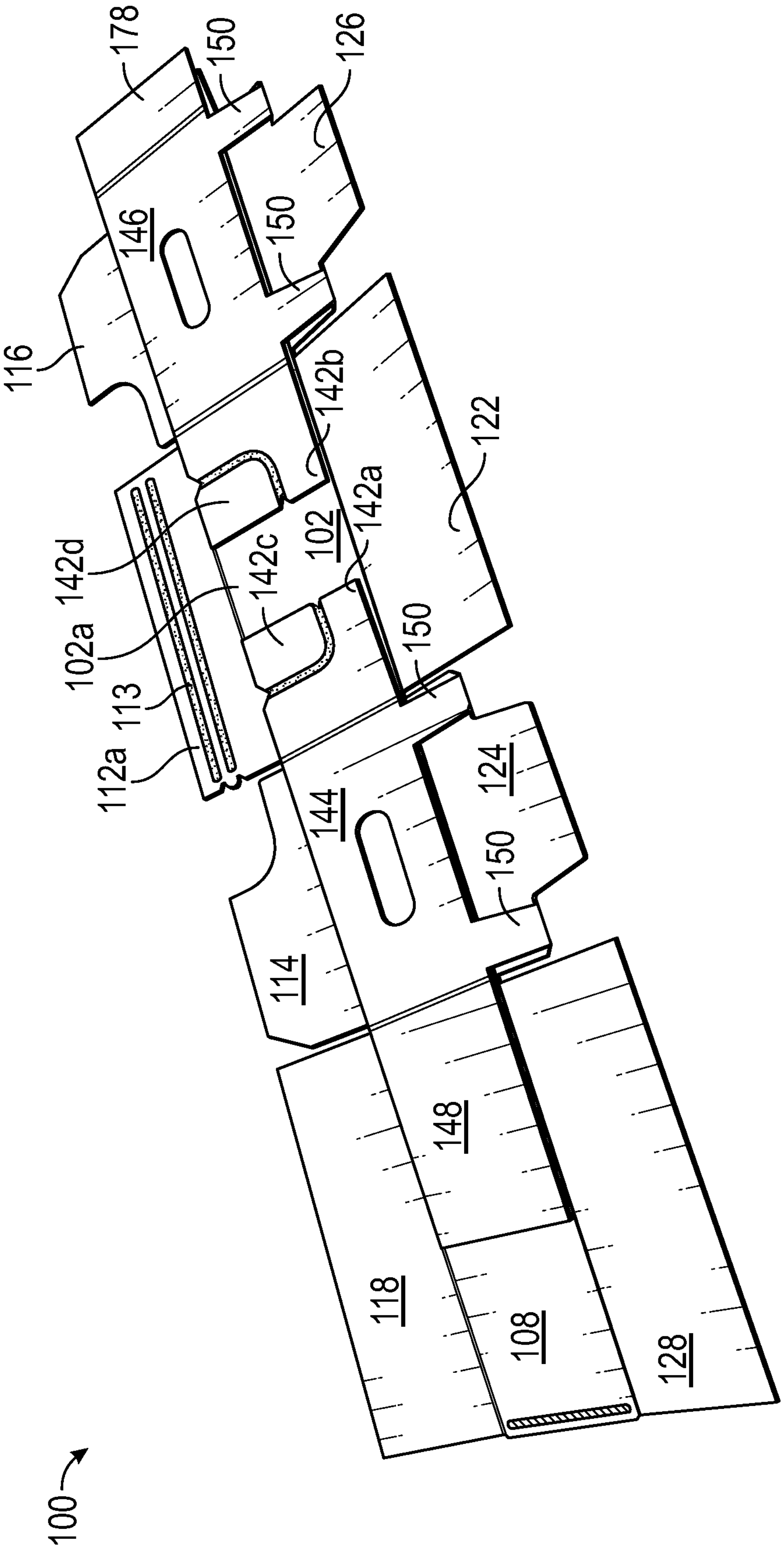
FIG. 4 illustrates the exemplary blank folded into the first intermediate stage of the KDF blank.

FIG. 3 illustrates the blank 100 partially folded about the first fold line 160 and FIG. 4 illustrates the blank 100 completely folded about the first fold line 160. Referring to FIG. 4, portions of the second side (e.g., original bottom side) are now on top.

Figure 5:
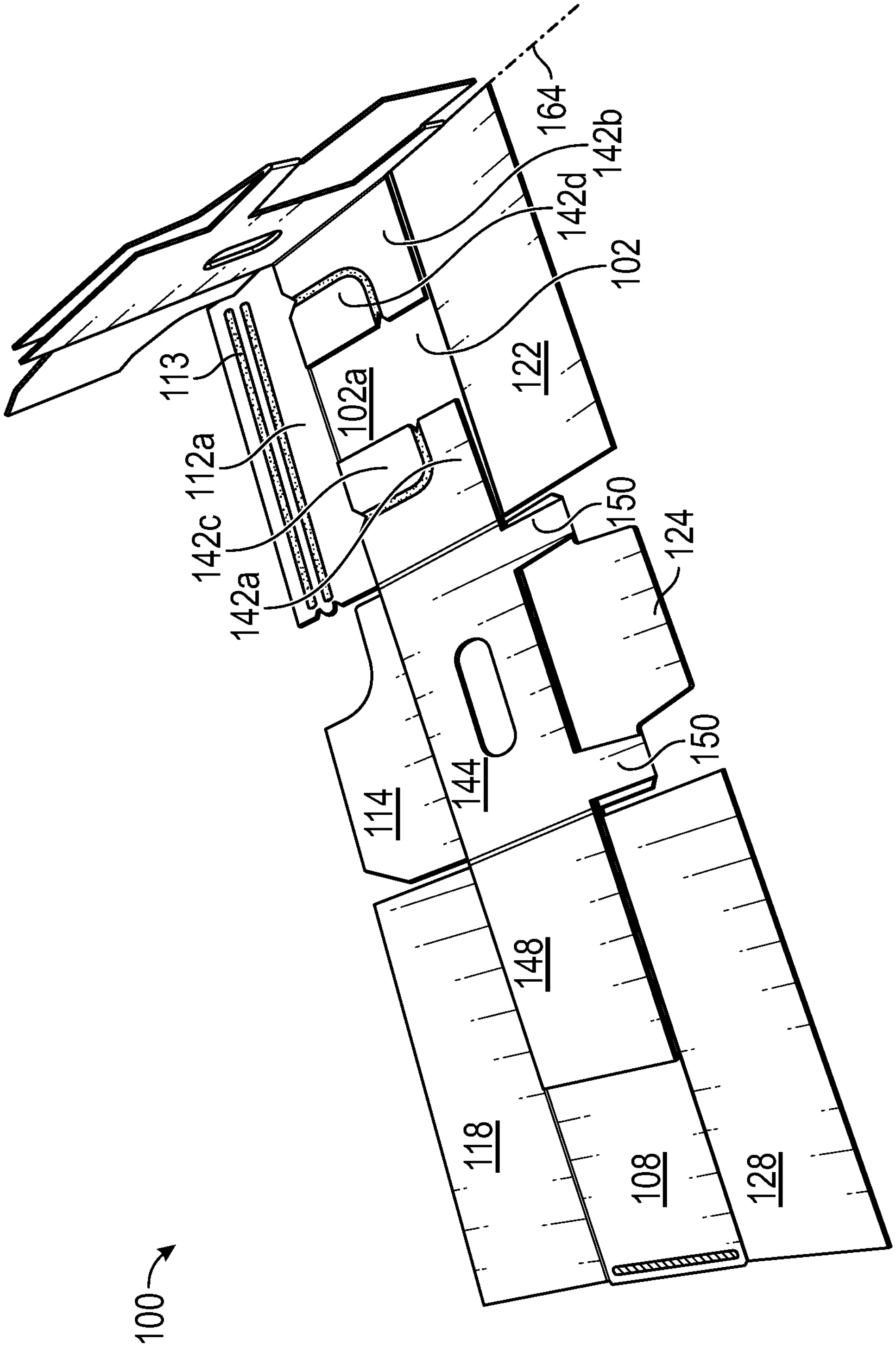
FIG. 5 illustrates an exemplary blank being folded into a second intermediate stage of constructing a KDF blank.

FIG. 5 illustrates blank 100 folded from the first folded configuration (e.g., FIG. 4) to a second folded configuration. The second folded configuration is obtained by folding the blank about second fold line 164.

Figure 6:
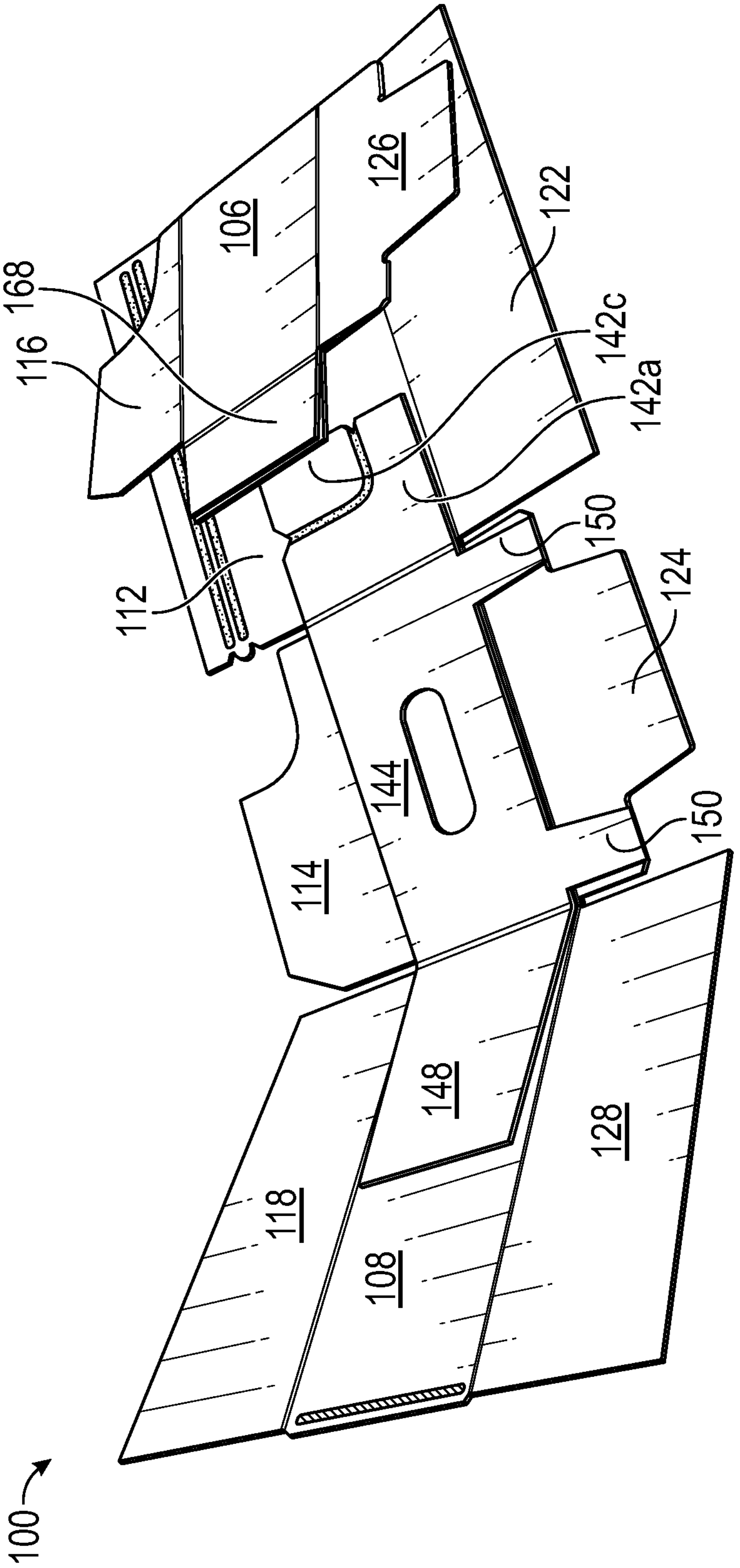
FIG. 6 illustrates an exemplary blank being folded into a third intermediate stage of constructing a KDF blank.
Figure 7:
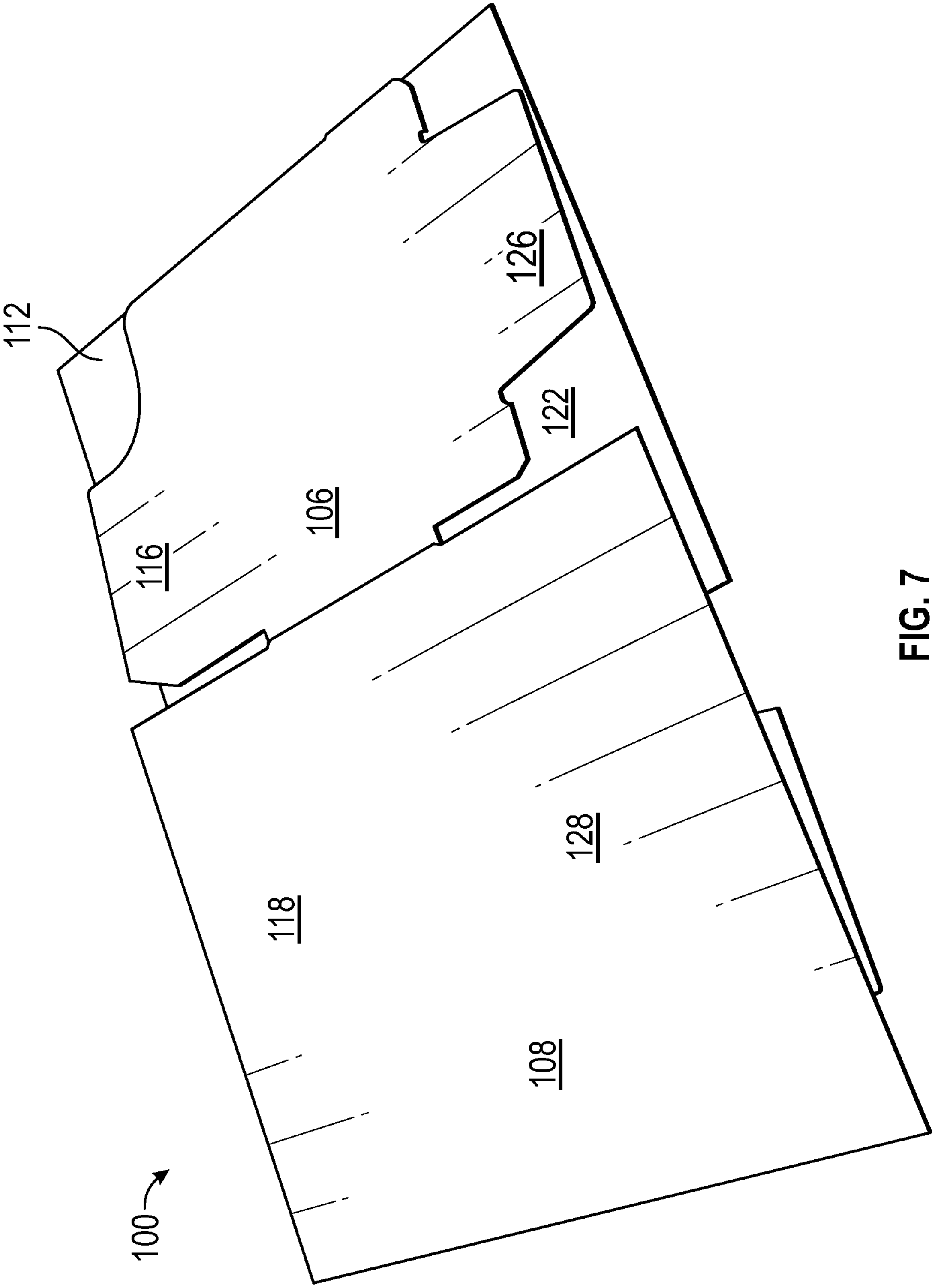
FIG. 7 illustrates the exemplary blank folded into the KDF blank.

FIGS. 6 and 7 illustrates blank 100 folded from the second configuration (e.g., FIG. 5) to a third folded configuration. The third folded configuration is obtained by folding the blank about third fold line 166. In the third folded configuration, one or more glue strips 162 or other adhesive can secure a portion of outer rear wall 108 with a flap 168 that extends from outer left wall 106. As shown in FIG. 1, corresponding flap 178 of the reinforcing portion 130 is secured to flap 168 in the first folded configuration. The resulting KDF blank (FIG. 7) can be shipped for use.

Figure 8:
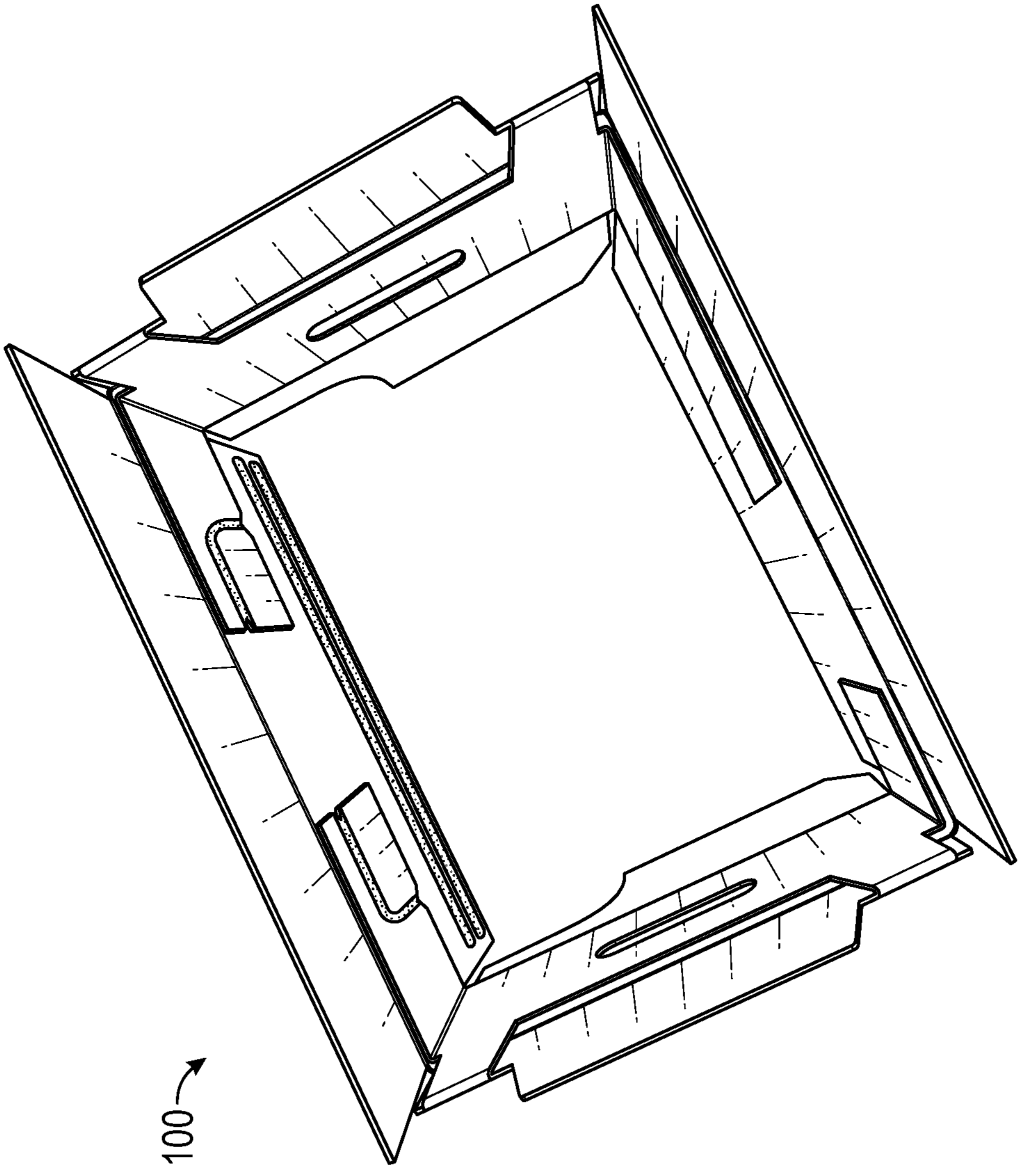
FIG. 8 illustrates an exemplary container being formed from the exemplary blank.
Figure 9:
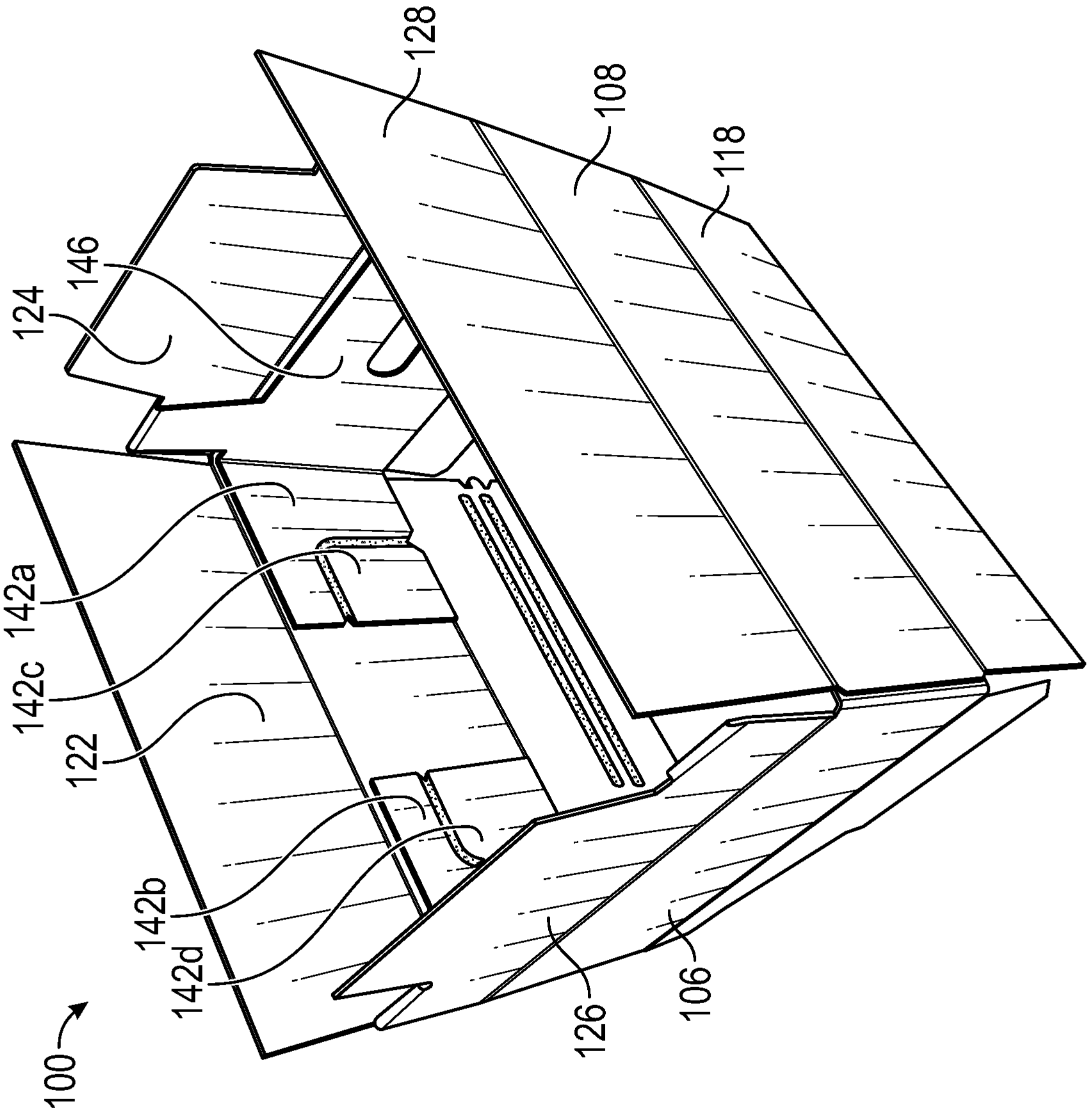
FIG. 9 illustrates the exemplary container being formed from the exemplary blank.

FIGS. 8 and 9 illustrates the KDF blank of FIG. 7 formed into a squared-up box configuration (viewed from the bottom) during formation of the KDF blank into the container.

Figure 10:
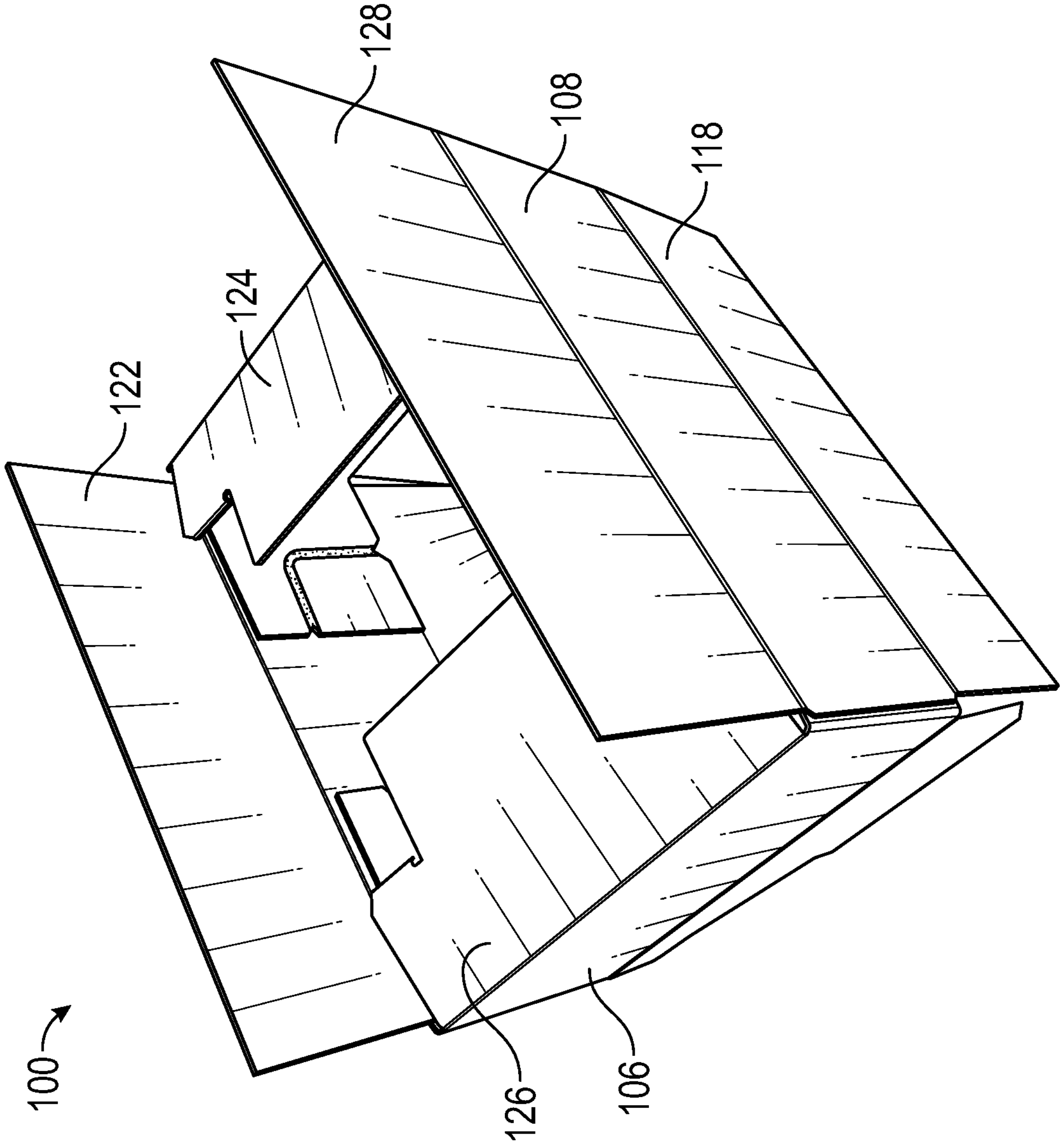
FIG. 10 illustrates the exemplary container formed from a blank and being closed at the bottom.
Figure 11:
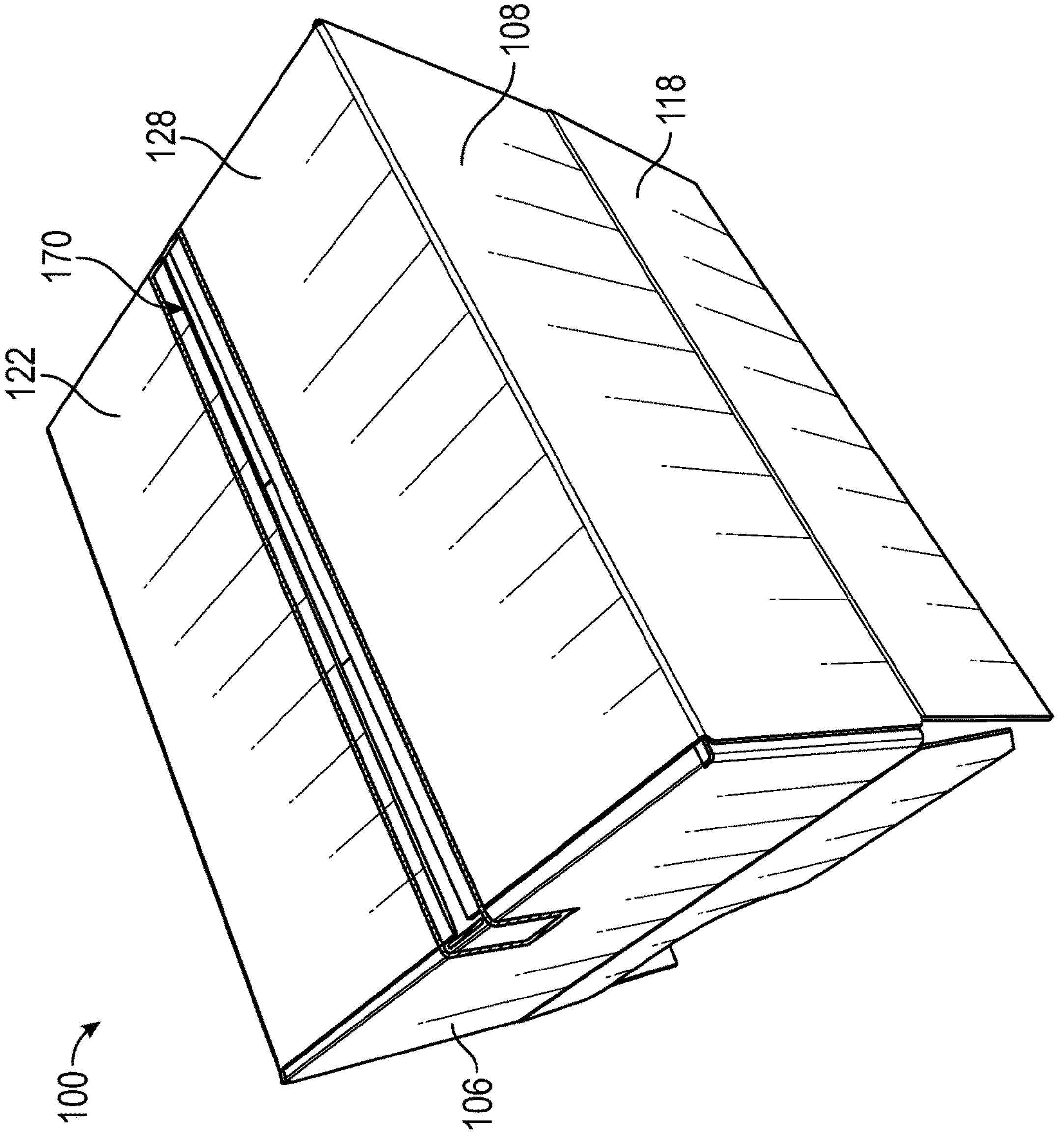
FIG. 11 illustrates the exemplary container closed at the bottom.

FIG. 10 illustrates a bottom view of the container formed from the KDF blank. As shown in FIG. 10, bottom minor flaps (e.g. bottom right wall 124 and bottom left wall 126) can be folded first and then bottom major flaps folded (e.g., bottom front wall 122 and bottom rear wall 128) enclosing the bottom minor flaps. FIG. 11 shows the bottom of the container closed and secured by a faster, such as tape 170.

Figure 12:
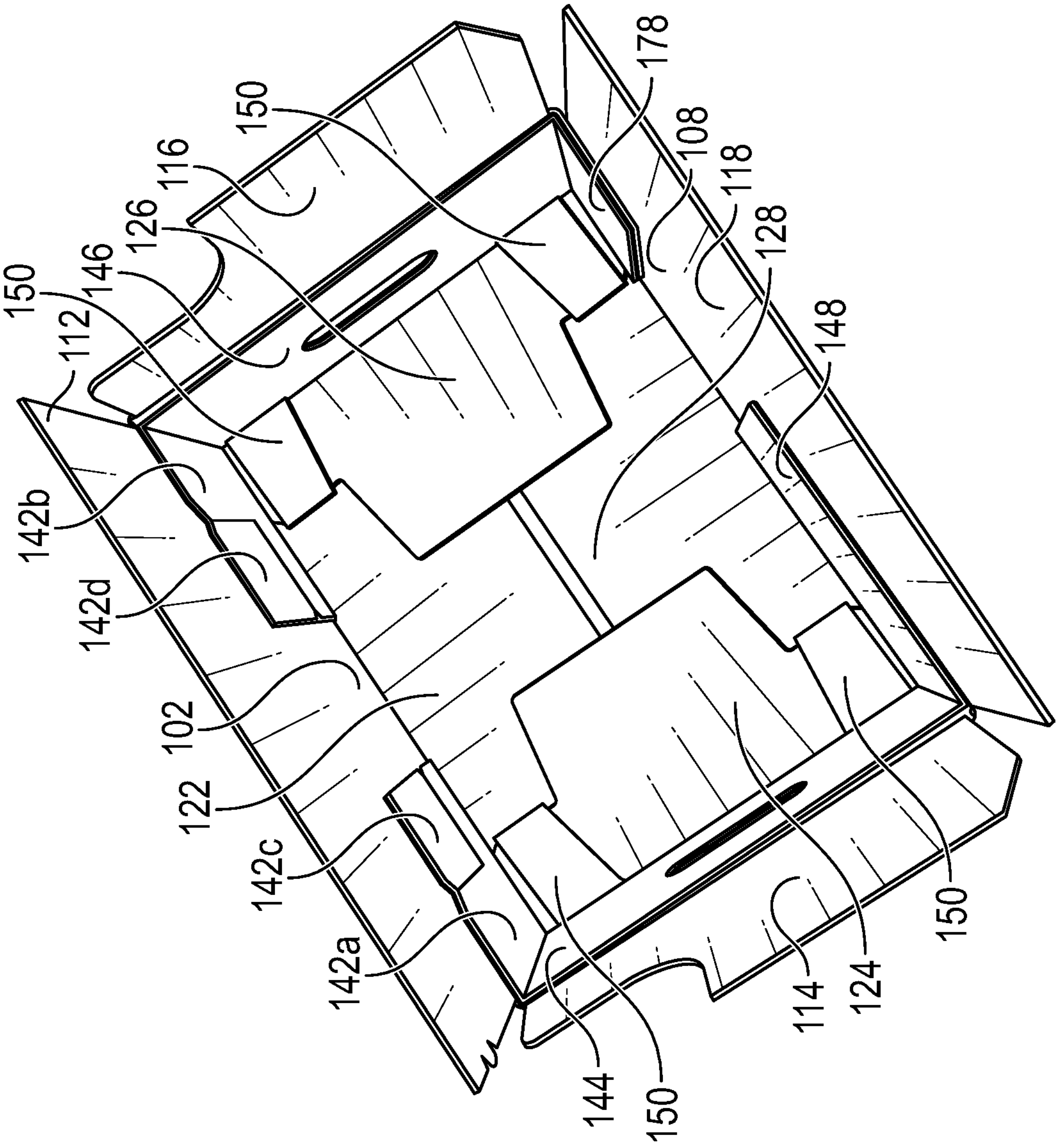
FIG. 12 is a top view of the exemplary container closed at the bottom.

FIG. 12 shows a top view of the container shown in FIG. 11 in a partially closed configuration. As shown in FIG. 12, the constructed box includes outer wall panels that are reinforced by the reinforcement portion 130. In this manner, the constructed box comprises a plurality of adjacent walls that provide greater structural strength.

Figure 13:
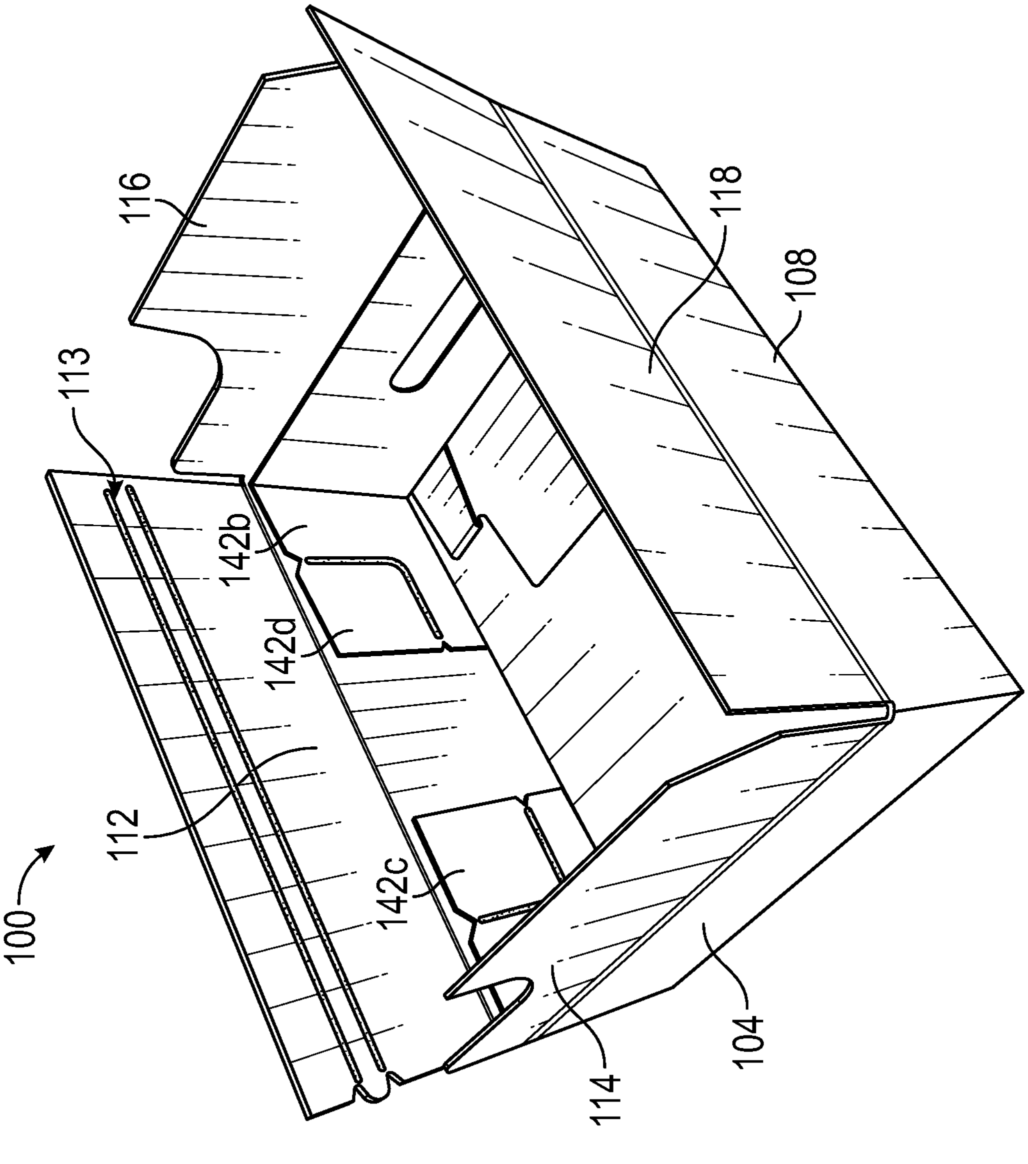
FIG. 13 is a top perspective view of the exemplary container closed at the bottom.

Referring to FIG. 12, a front side of the box is collectively formed from outer front panel 102 and inner reinforced portions 142*a*, 142*b*, 142*c*, 142*d*. A right side of the box is collectively formed from outer right side wall 104 and inner right side portion 144, while the left side of the box is collectively formed from outer left side wall 106 and inner left side portion 146. A rear of the box is collectively formed from outer rear wall 108 and inner rear wall portion 148 and flap 168. In this embodiment, inner flaps are glued against the inner faces of the outside wall surfaces and generally form 90 degree corners, while the inner side panels (inner right side portion 144 and inner left side portion 146) are free to move relative to adjacent surfaces. However, it should be understood that other arrangements are possible where at least some other adjacent surfaces can be attached to one another or, alternatively, free to move. FIG. 13 illustrates another view of the box shown in FIG. 12.

Figure 14:
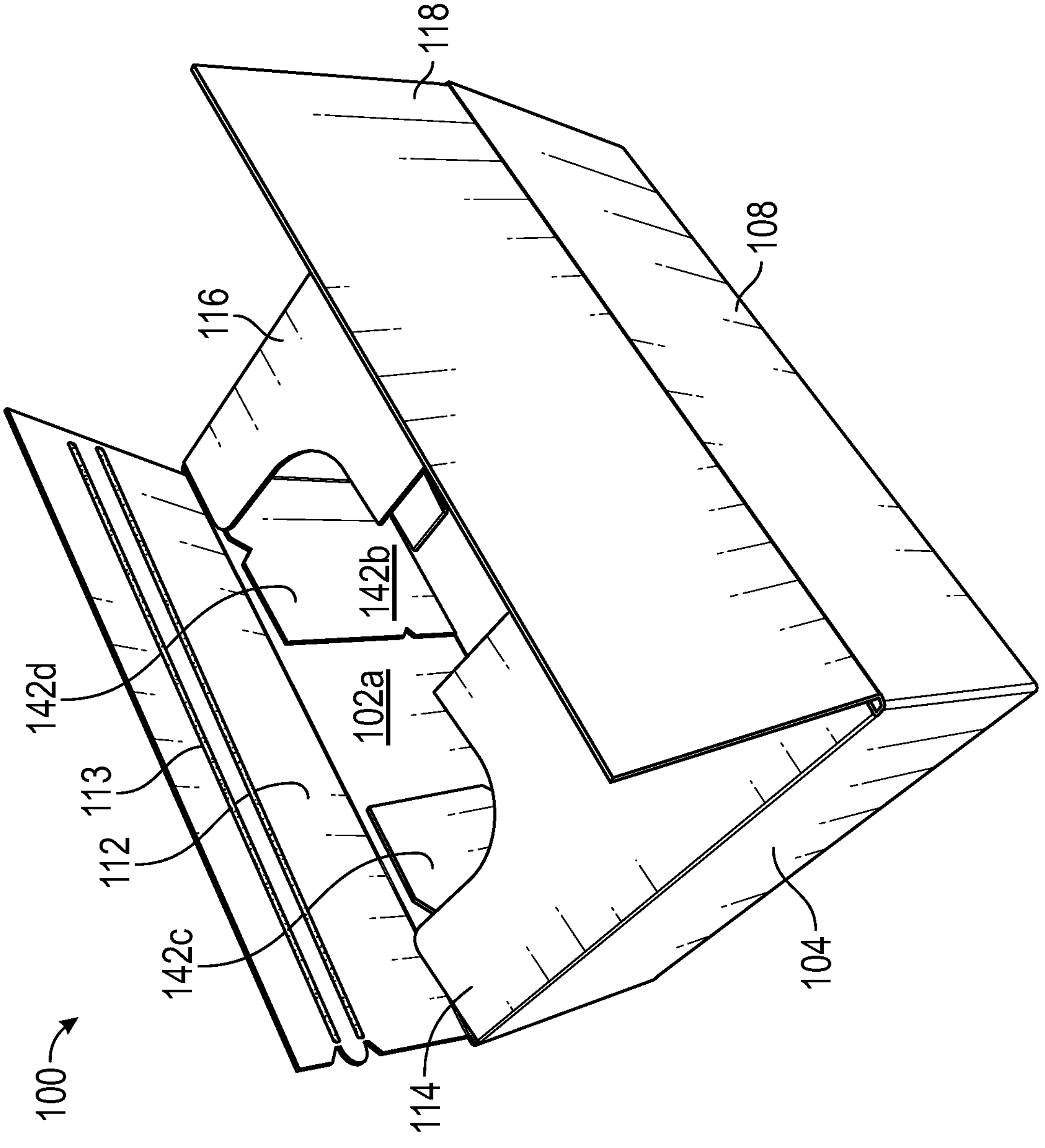
FIG. 14 is a top perspective view of the exemplary container being closed at the top.
Figure 15:
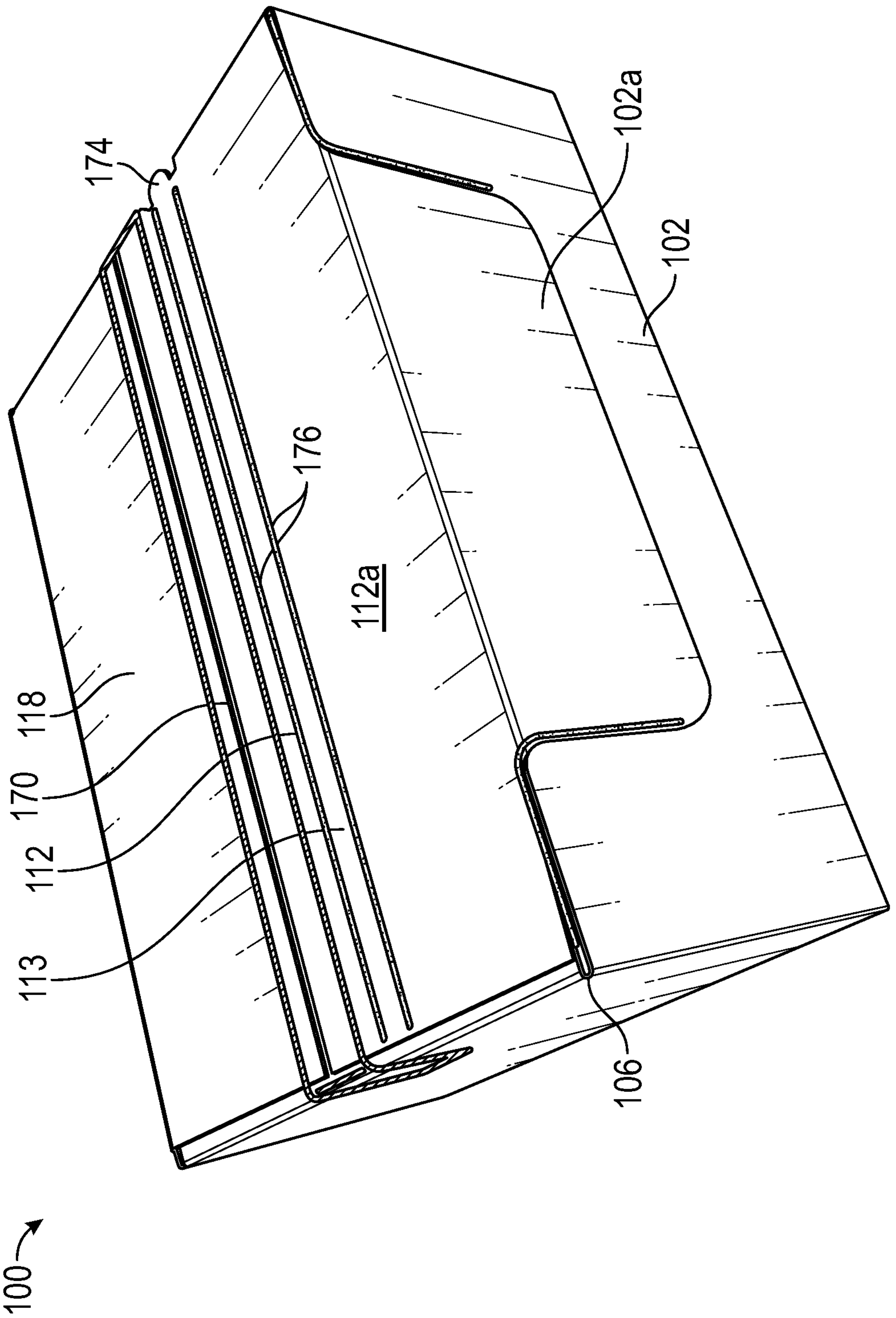
FIG. 15 is a top perspective view of the exemplary container in a closed configuration.

FIG. 14 illustrates the top minor panels (i.e., top right wall 114 and top left wall 116) being folded to close the box, and FIG. 15 shows the top major panels (i.e., top front wall 112 and top rear wall 118) being folded to complete the closure of the box. FIG. 15 illustrates the front of the box shown in FIG. 14. Tape 170 can be provided to further secure the box in the closed position.

Figure 16:
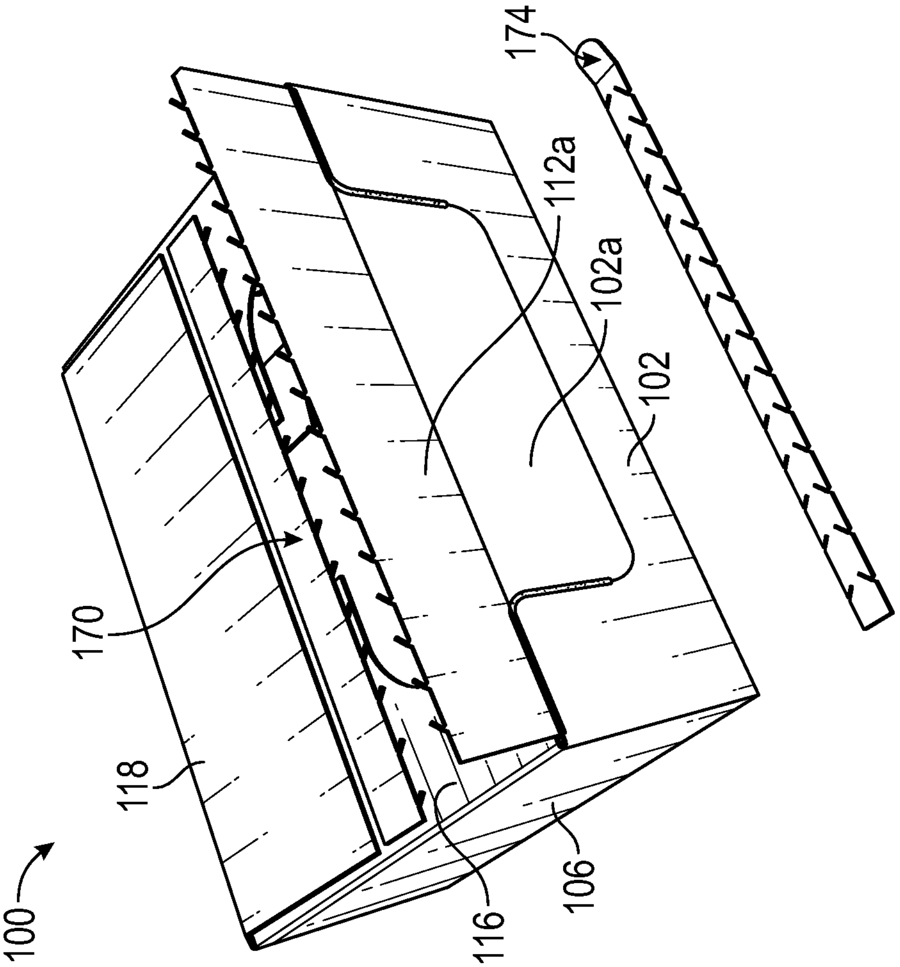
FIG. 16 illustrates the exemplary container after the removal of a tear strip.
Figure 17:
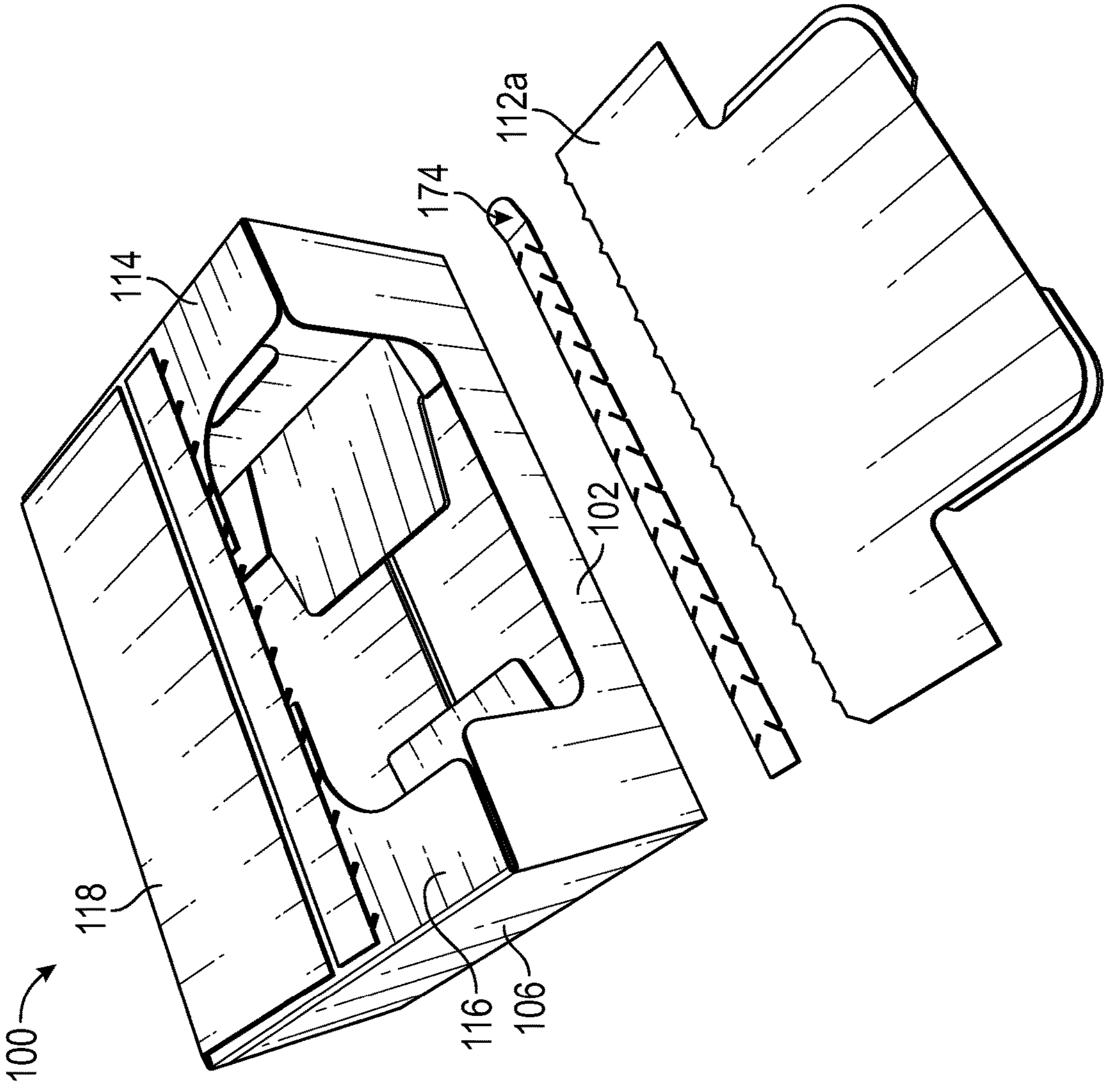
FIG. 17 illustrates the exemplary container after the removal of one or more removable panels.
Figure 18:
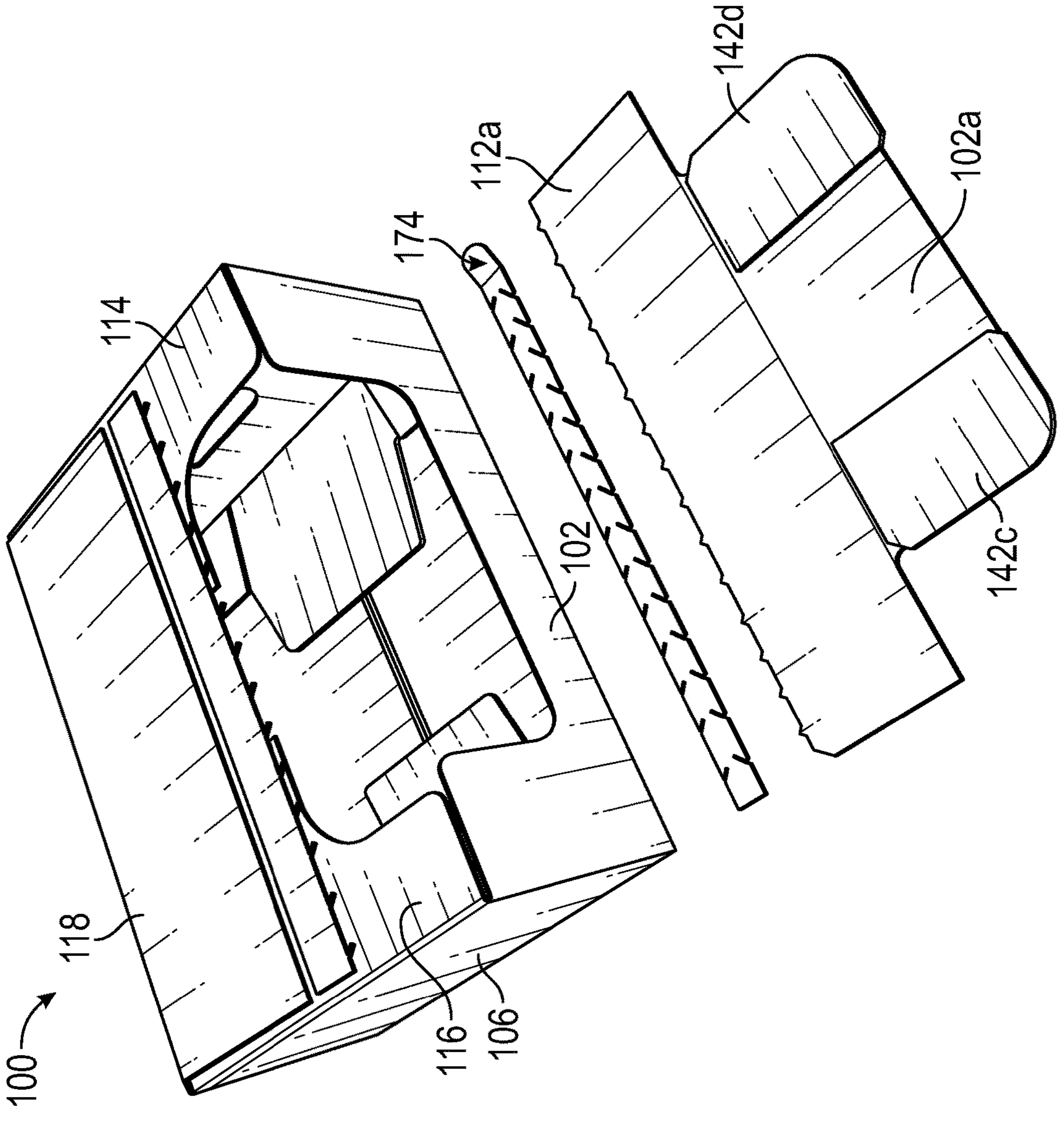
FIG. 18 is another view of the exemplary container after the removal of one or more removable panels.
Figure 19:
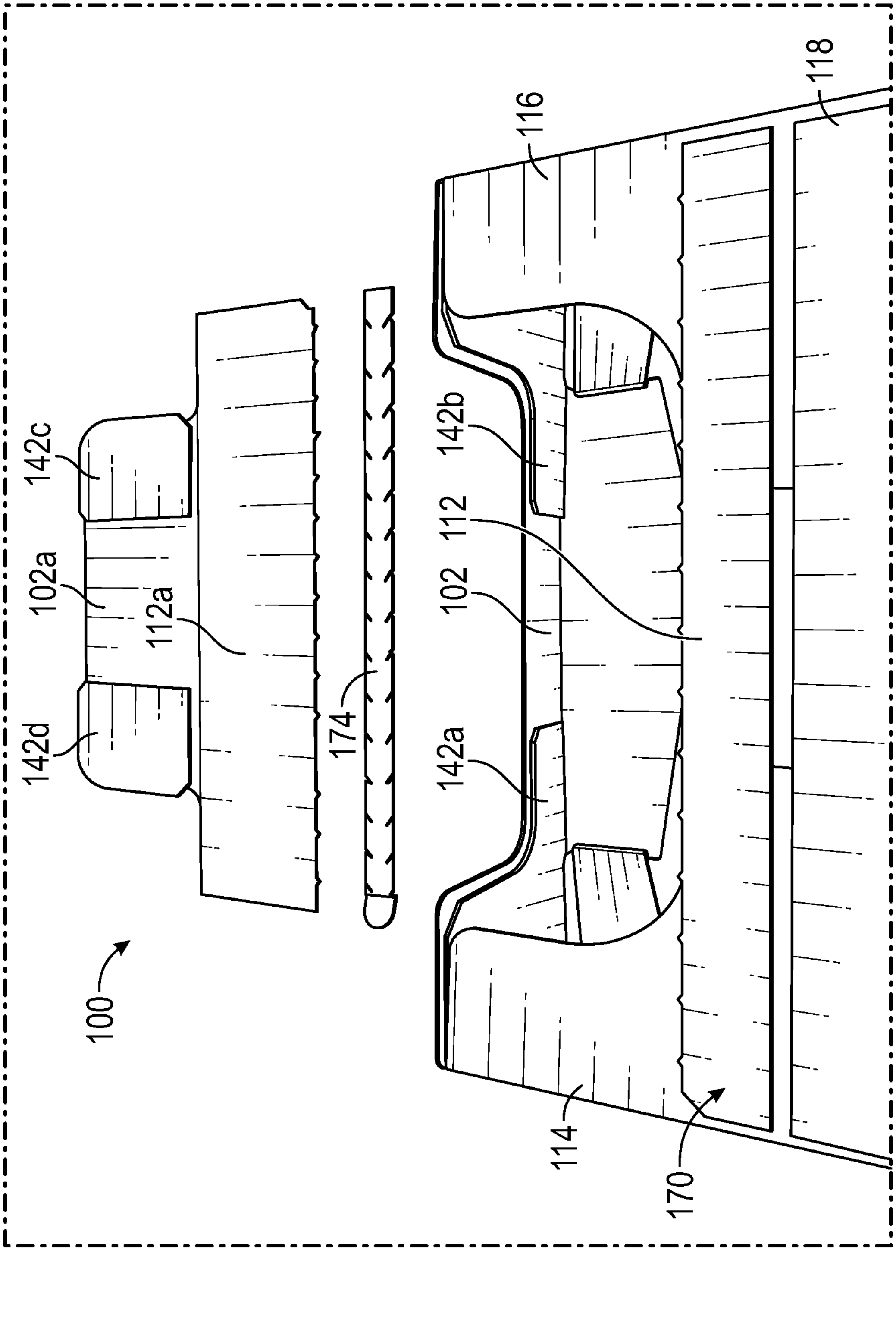
FIG. 19 is a rear view of the exemplary container after the removal of one or more removable panels.

A tear away strip 174 is illustrated in FIG. 15, along with its tear lines 176 of the tear strip 113 (illustrated throughout for convenience). As shown in FIG. 16, the opening of the box can be facilitated by removing the tear strip 174, which separates portions of the top front wall 112. FIG. 17 shows the tear strip 174 and the removable panels 102*a*, 112*a* removed from the box to gain entry into the contents of the box. FIG. 18 illustrates the removed portion (i.e., removable panels 102*a*, 112*a*) reversed to reveal the removal of removable panels 142*c*, 142*d* of the inner front wall portions. FIG. 19 illustrates another view of the box to show the manner in which the two inner front wall portions 142*a*, 142*b* are positioned adjacent the outer front wall 102 to reinforce that member.

Figure 20:
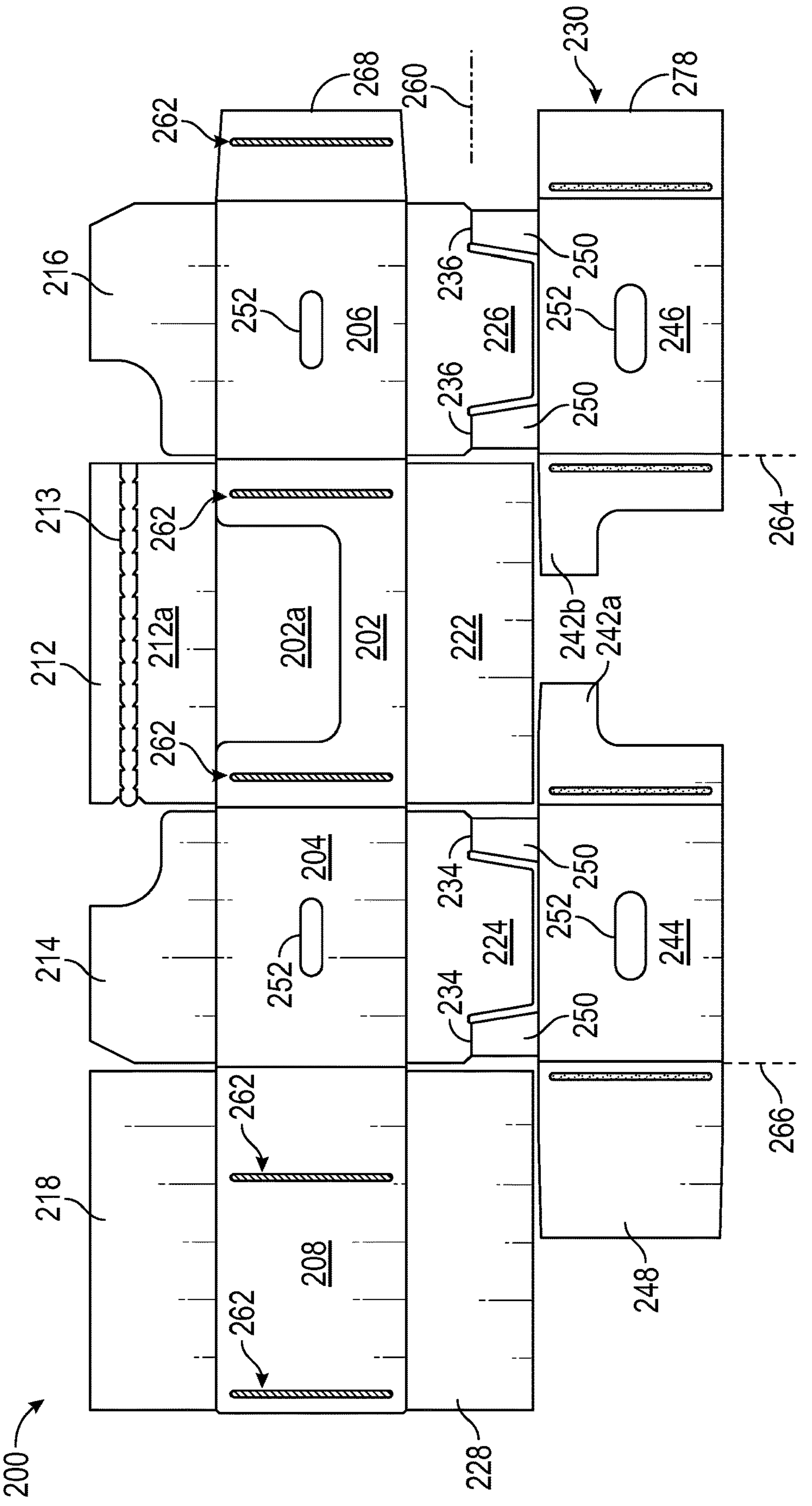
FIG. 20 illustrates a first side of another exemplary blank for constructing a container.

FIG. 20 illustrates another embodiment of a blank for constructing a container. Similar reference numerals to those used in FIG. 1 are used with regard to FIG. 20 to indicate similar parts. For example, blank 200 can be constructed into a container that comprises a plurality of side walls that provide improved structural integrity, including improved stacking strength. Blank 200 has an outer front wall 202, and outer right side wall 204, an outer left side wall 206, and an outer rear wall 208. Blank 200 also has a top front wall 212, a top right wall 214, a top left wall 216, and a top rear wall 218. In addition, blank 200 has a bottom front wall 222, a bottom right wall 224, a bottom left wall 226, and a bottom rear wall 228.

FIG. 20 differs from the embodiment of FIG. 1 by eliminating the removable panels 142*c* and 142*d* (FIG. 1) of inner front wall portions 242*a*, 242*b*. In this embodiment, removable panel 202*a* of the outer front wall 202 does not overlap with the inner front wall portions 242*a*, 242*b*. As in the other embodiment, the removable panel 212*a* of the top front wall 212 can be hingedly coupled to portions of the removeable panel 202*a* so that removal of both collectively provides a display opening that extends from the front wall to the top wall.

Figure 21:
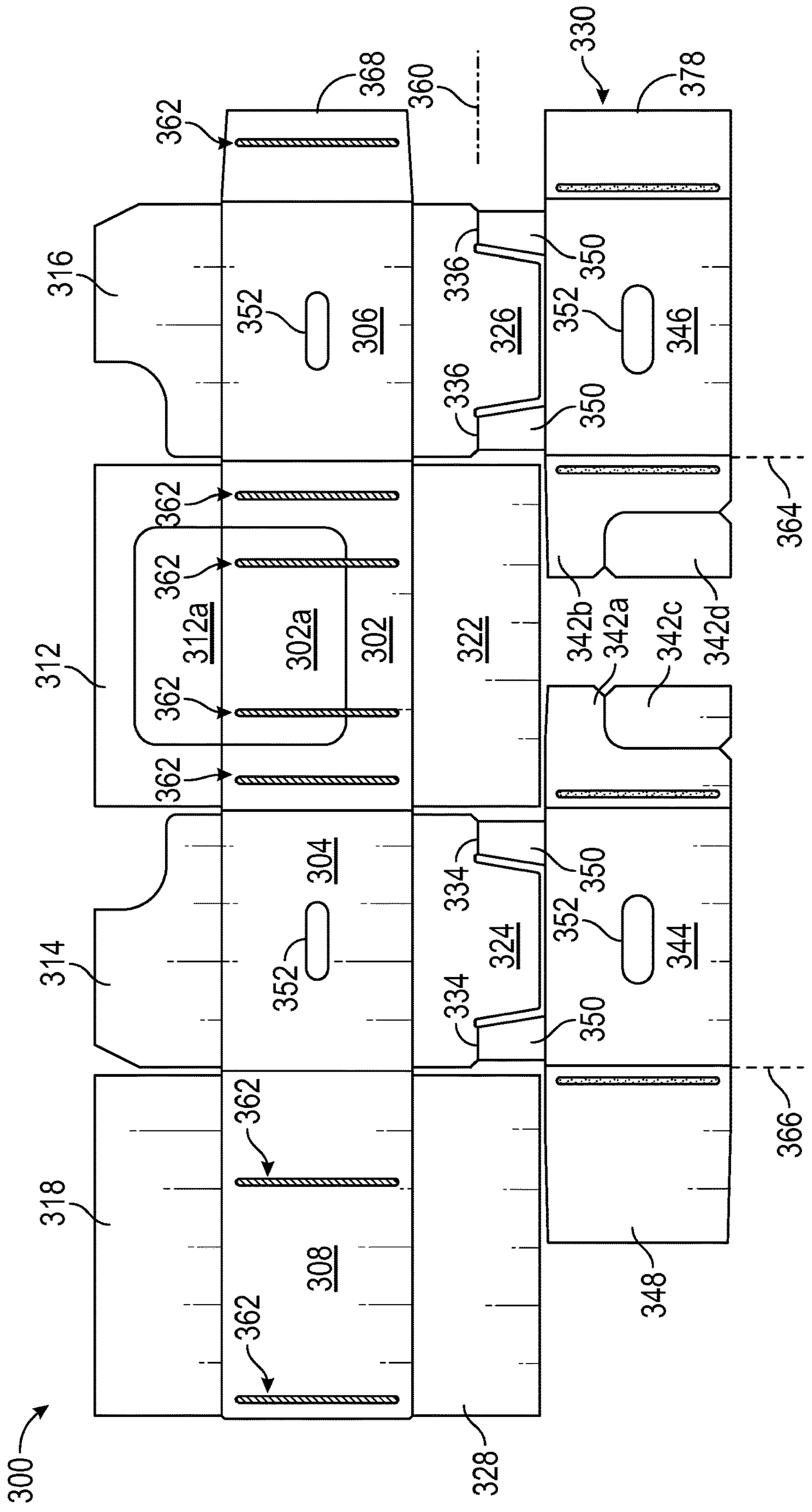
FIG. 21 illustrates a first side of another exemplary blank for constructing a container.

FIG. 21 illustrates another embodiment of a blank for constructing a container. Similar reference numerals to those used in FIG. 1 are also used with regard to FIG. 21 to indicate similar parts. For example, blank 300 can be constructed into a container that comprises a plurality of side walls that provide improved structural integrity, including improved stacking strength. Blank 300 has an outer front wall 302, and outer right side wall 304, an outer left side wall 306, and an outer rear wall 308. Blank 300 also has a top front wall 312, a top right wall 314, a top left wall 316, and a top rear wall 318. In addition, blank 300 has a bottom front wall 322, a bottom right wall 324, a bottom left wall 326, and a bottom rear wall 328.

FIG. 21 differs from the embodiment of FIG. 1 by providing a different shape of the collective display opening. In particular, removable panel 312*a* of the top front wall 312 does not extend substantially the width of the top front wall 312. Rather, it extends a shorter distance and can have, for example, the same width as the removeable panel 302*a* so that removal of both collectively provides a display opening that extends from the front wall to the top wall and has the same width.

The containers disclosed herein provide significant benefits over conventional containers, including, for example, by providing retail ready packaging (e.g., removable panels) with sufficient stacking strength to support higher loads than conventional containers. In addition, in some embodiments and with certain equipment, the blanks disclosed herein can be folded and glued on a single piece of equipment, simplifying manufacture. In some embodiments, alternatively or additionally, internal walls can have different shapes and/or may align with the outer walls at other locations.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A corrugated fiberboard container comprising:

an exterior portion comprising a front wall, a rear wall, a left side wall, a right side wall, a bottom section, and a top section;

a reinforcing portion that comprises at least a first front wall reinforcement portion and a second front wall reinforcement portion, the first and second front wall reinforcement portions being spaced apart from one another and secured to the front wall, wherein the front wall comprises a first removable panel.

2. The corrugated fiberboard container of claim 1, wherein the first front wall reinforcement portion comprises a second removable panel, and the second front wall reinforcement portion comprises a third removable panel, and wherein the second and third removeable panels overlap with the first removable panel, such that removal of the first removable panel also removes the second and third removable panels.

3. The corrugated fiberboard container of claim 2, wherein the reinforcing portion comprises a right reinforcing panel and a left reinforcing panel, the right reinforcing panel including the first front wall reinforcement portion and the left reinforcing panel including the second front wall reinforcement portion.

4. The corrugated fiberboard container of claim 3, wherein the reinforcing portion further comprises a right side wall reinforcement portion and the left reinforcing panel further comprises a left side wall reinforcement portion, the right side wall reinforcement portion being positioned adjacent the right side wall and the left side wall reinforcement portion being positioned adjacent the left side wall.

5. The corrugated fiberboard container of claim 3, wherein the bottom section comprises a bottom front wall, a bottom rear wall, a bottom right wall, and a bottom left wall, and the right reinforcing panel extends from the bottom right wall and the left reinforcing panel extends from the bottom left wall.

6. The corrugated fiberboard container of claim 3, wherein the top section comprises a top front wall, a top rear wall, a top right wall, and a top left wall, and the top front wall comprises a fourth removable panel that extends from and is continuous with the first removable panel.

7. The corrugated fiberboard container of claim 6, wherein the top front wall comprises a tear strip that extends across a width of the top front wall to separate the fourth removable panel from the top front wall.

8. The corrugated fiberboard container of claim 6, wherein the top right wall and top left wall are shaped to collectively define an opening into the corrugated fiberboard container through the top section when the fourth removable panel is removed.

9. The corrugated fiberboard container of claim 4, wherein the right side wall reinforcement portion is unattached to the right side wall and the left side wall reinforcement portion is unattached to the left side wall.

10. The corrugated fiberboard container of claim 4, wherein the right side wall reinforcement portion and right side wall comprise first aligned removable handle portions and the left side wall reinforcement portion and left side wall comprise second aligned removable handle portions.

11. The corrugated fiberboard container of claim 4, wherein the first front wall reinforcement portion and the right side wall reinforcement portion are angled relative to one another to correspond to a first angle of the front wall and right side wall, and the second front wall reinforcement portion and the left side wall reinforcement portion are angled relative to one another to correspond to a second angle of the front wall and left side wall.

12. The corrugated fiberboard container of claim 6, wherein removing the first, second, third, and fourth removable panels defines an opening that extends from the front wall to the top section.

13. A method of forming a corrugated fiberboard container comprising:

providing a blank comprising an exterior portion comprising a front wall, a rear wall, a left side wall, a right side wall, a bottom section, and a top section;

folding the blank about a first fold line to position a reinforcing portion adjacent to inner surfaces of the exterior portion, the reinforcing portion comprising at least a first front wall reinforcement portion and a second front wall reinforcement portion, the first and second front wall reinforcement portions being spaced apart from one another;

securing at least some portions of the reinforcing portion to inner surfaces of the exterior portion;

folding the blank about a second fold line and about a third fold line and securing adjacent portions to form an open ended box;

positioning the blank to form a container with at least the front side wall, right side wall, and left side wall being adjacent respective areas of the reinforcing portion, wherein the front wall comprises a first removable panel.

14. The method of claim 13, wherein the first front wall reinforcement portion comprises a second removable panel, and the second front wall reinforcement portion comprises a third removable panel, and wherein the second and third removeable panels overlap with the first removable panel, such that the removal of the first removable panel also removes the second and third removable panels.

15. The method of claim 13, wherein the reinforcing portion comprises a right reinforcing panel and a left reinforcing panel, the right reinforcing panel including the first front wall reinforcement portion and the left reinforcing panel including the second front wall reinforcement portion, and folding the blank about the first fold line comprises positioning the right reinforcing panel adjacent to the front wall and positioning the left reinforcing panel adjacent the front wall.

16. The method of claim 13, wherein the bottom section comprises a bottom front wall, a bottom rear wall, a bottom right wall, and a bottom left wall, and the right reinforcing panel extends from the bottom right wall and the left reinforcing panel extends from the bottom left wall prior to folding the blank about the first fold line.

17. The method of claim 14, further comprising forming the top section by moving a top front wall, a top rear wall, a top left wall and a top right wall to collectively define the top section, wherein the top front wall comprises a fourth removable panel that extends from and is continuous with the first removable panel.

18. The method of claim 17, wherein the top front wall comprises a tear strip that extends across a width of the top front wall to separate the fourth removable panel from the top front wall.

19. The method of claim 18, wherein removing the first, second, third, and fourth removable panels defines an opening that extends from the front wall to the top section.

20. The method of claim 13, wherein the bottom section is formed by moving a front bottom wall, a rear bottom wall, two left side bottom walls and two right side bottom walls to collectively define the bottom section.

* * * * *